United States Patent [19]

Katz

[11] Patent Number: 5,136,434
[45] Date of Patent: Aug. 4, 1992

[54] COMPUTER TERMINAL OPERATORS PROTECTIVE DEVICE #2

[76] Inventor: Joseph M. Katz, 11 Meadow Rd., Old Westbury, N.Y. 11568

[21] Appl. No.: 696,149

[22] Filed: May 16, 1991

[51] Int. Cl.$^5$ .............................................. G02B 5/08
[52] U.S. Cl. ..................................... 359/862; 359/871
[58] Field of Search ................. 350/612, 618, 623, 631

[56] References Cited

U.S. PATENT DOCUMENTS

| 4,605,291 | 8/1986 | Jolly | 350/623 |
| 4,717,248 | 1/1988 | La Russa | 350/618 |
| 4,759,621 | 7/1988 | Hawkins | 350/623 |
| 4,880,300 | 11/1989 | Payner et al. | 350/623 |
| 4,930,884 | 6/1990 | Tichnor et al. | 350/618 |

Primary Examiner—Bruce Y. Arnold
Assistant Examiner—J. P. Ryan

[57] ABSTRACT

A low cost non-electrical device to afford some protection to computer terminal operators and adjacent persons from the short range rays and electromagnetic fields, as well as providing a comfortable eye level view of the images on the video screen. Also, as an option, a glare shield and/or magnifier can be attached.

4 Claims, 3 Drawing Sheets

COMPUTER TERMINAL OPERATORS PROTECTIVE DEVICE #2

BACKGROUND OF THE INVENTION

There is much concern throughout the world that Computer Video Terminals (VTR'S) are emitting harmful rays and electromagnetic fields that endanger their operators by attacking the genes, which over a long period of time can cause cancer. Also, there is concern that they also can effect pregnant women, causing miscarriages and danger to the embroyo.

Current thinking believes that the ELF and VLF rays are part of the problem, with the electromagnetic fields also contributing.

It is believed that the ELF & VLF rays are strongest close to the VTR and dissipate quickly with distance. The electromagnetic fields are still an enigma, but it is believed that they can be reduced by proper shielding and grounding.

It is therefore the purpose of this invention to provide a means for some protection to the operators of VTR's from the ELF and VLF rays and electromagnetic fields.

Since VTR operators view the screen within a few feet of their bodies, it is believed that the further the operator is from the screen, the safer it is.

Also, present day thinking believes that rays and fields emanate from the back, top, bottom and sides as well as the front. Therefore, providing protection from the front only, such as with a glare shield, is insufficient.

Furthermore, since the rays and fields emanate from other than the front of the VTR and operators of VTR's work side by side in rows and clusters, the accumulation of the rays and fields all at the same level multiplies the problem.

Therefore, it appears that the answer to the problem is to distance the VTR from the operator. Therefore the purpose of the invention is to put distance between the VTR and the operator and other operators nearby and to provide a shielding and grounding to divert the electromagnetic fields. To accomplish this, the invention consists of a reflecting mirror, a tunnel, shielding and grounding, an optional provision for magnification and/or glare shield. With the adjustment at the work station, it puts distance and height as well as providing comfortable eye level viewing and gives some protection against the short range rays. The shielding and grounding, also done at the work station, provides some protection against the electromagnetic fields for the operators and other persons nearby, since the VTR is placed above their heads.

SUMMARY OF THE INVENTION

Figure 1:
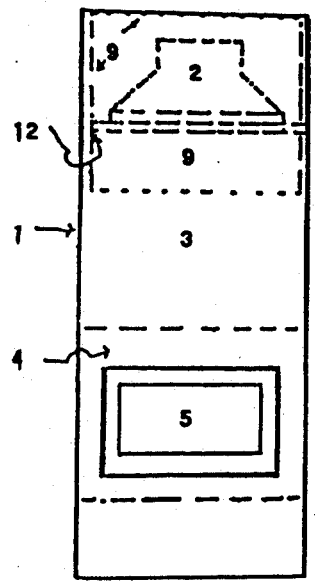
FIG. 1 is a front view of the device with the VTR enclosed in the cabinet.

The VTR can either be built into a cabinet or an open top vertical cabinet upon which the VTR is placed. The cabinet (tunnel) is placed in a verticaal position with an open end at the top. The VTR is placed either completely or partially, screen facing downward, into the top of the cabinet, depending upon which cabinet meets the needs of the user. An aperture is cut into the cabinet on one side at a lower level and the reflecting mirror is placed at an angle inside the cabinet, accross the tunnel, at the aperture level, angled to catch the images from the VTR screen above and reflect them outward through the aperture opening at the eye level of the operator, for viewing. If desired, an optional glare shield and/or magnifier can be attached to the aperture opening. This provides the distance from the VTR to the operator for some protection from the ELF and VLF rays. The cabinet can be made of any strong material, metal, wood, plastic, etc., that can sustain the weight of the VTR. If required to steady the cabinet, various types of common fastenings can be attached, some examples are given in the drawings.

If the cabinet is made of metal or other conductor of electricity, the grounding wire is attached directly to a convenient place on the cabinet. If the cabinet is made of a non-conductive material, then aluminum foil shielding is placed inside and/or outside of the cabinet at the VTR end and partially down the tunnel. The shielding is affixed with a grounding wire to divert the electromagnetic fields. Thereby, the invention permits the placing of the VTR at any required height above and away from the operator for some protection against the short range rays, yet permits the operator to view the images on the VTR screen at a comfortable eye level, close position, by non-electric reflection, with the option of easily attaching a glare filter and/or a magnifier.

The shielding and/or grounding device affords some protection against the electromagnetic fields by diverting them through grounding.

DETAILED DESCRIPTION OF THE DRAWINGS

Figure 2:
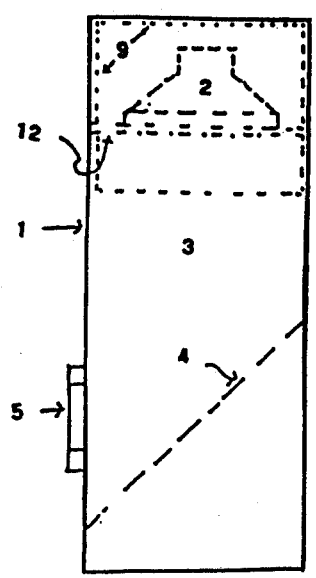
FIG. 2 is a side view of FIG. 1.
Figure 3:
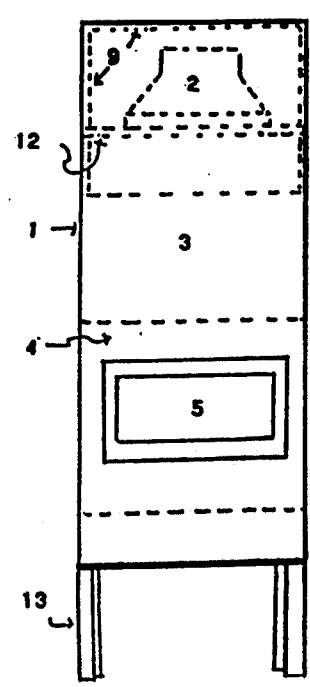
FIG. 3 is a front view of FIG. 1, with adjustable legs to accomodate height adjustments.
Figure 4:
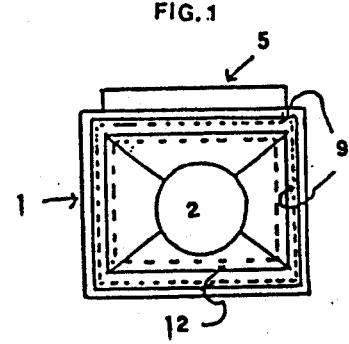
FIG. 4 is a top view of FIG. 1
Figure 5:
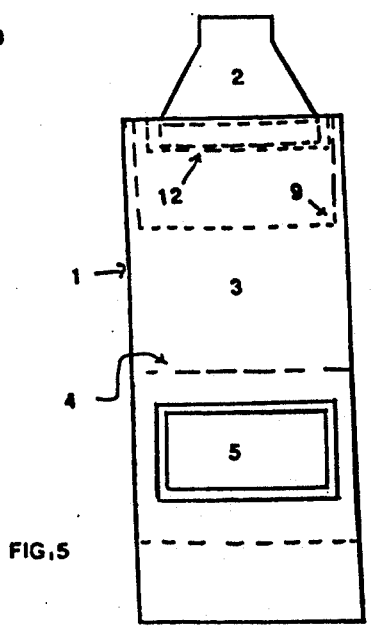
FIG. 5 Is a front view of the device with VTR not fully enclosed as in FIG. 1. VTR is inserted at the top of the device to provide simple installation and lower cost.
Figure 6:
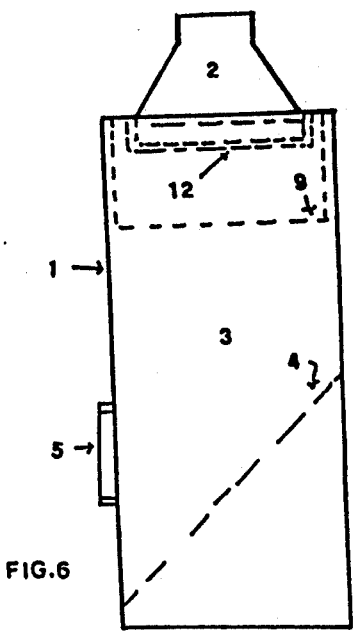
FIG. 6 is a side view of FIG. 5.
Figure 7:
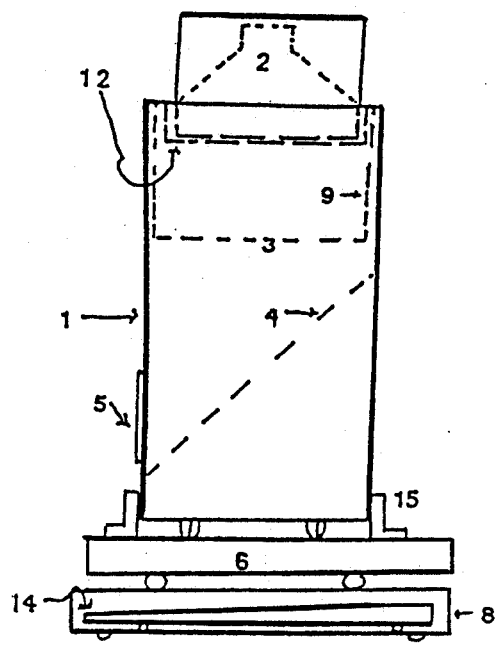
FIG. 7 is a side view exhibit of FIG. 5 installed at a work station with computer and keyboard.
Figure 8:
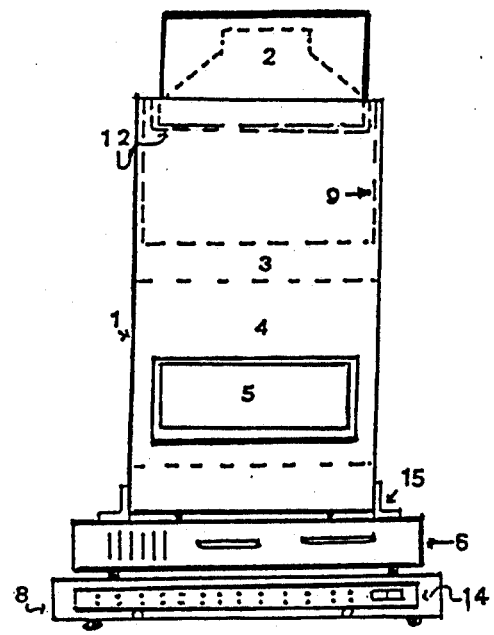
FIG. 8 is a front view of FIG. 7.
Figure 9:
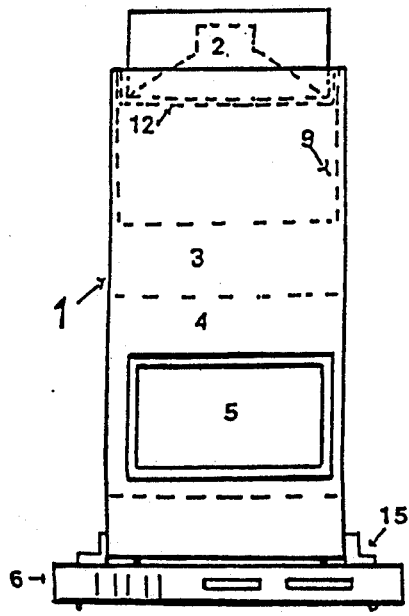
FIG. 9 is a front view exhibit of FIG. 5 installed on a computer.
Figure 10:
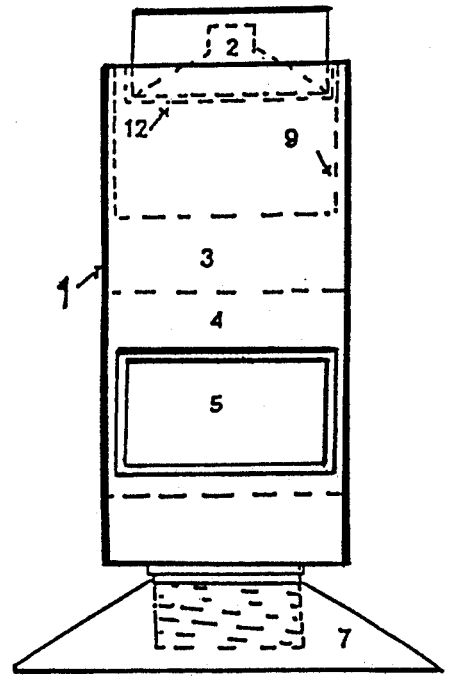
FIG. 10 is a front view of FIG. 5 installed on a pyramid type center screw adjustable stand, for height and 360 degree adjustable viewing.
Figure 11:
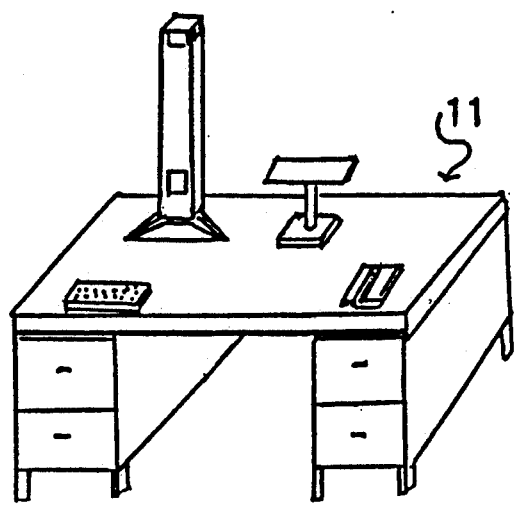
FIG. 11 is an exhibit of the FIG. 10 device installed on a desk or work station, which is also applicable to the FIG. 1 device.

Referring to all the drawings. The numbers herewith represent the various parts of FIG. 1–11.

The cabinet 1. The VTR 2. The tunnel 3. The reflective mirror 4. The aperture 5. The computer 6. The pyramid type swivel resting device stand 7. A monitor/keyboard metal container with invention resting upon or inserted onto 8. Aluminum foil shielding or substitute shielding 9. Wall or office partition 10. Work Station 11. VTR resting ledge 12. Adjustable legs 13. Keyboard 14. Fasteners 15.

While various changes may be made in the detailed construction, such changes will be within the spirit and scope of the present invention, as defined by the appended claims.

I claim:

1. A device that will protect computer terminal operators from potentially harmful short range rays and electromagnetic fields, said device comprising:
   a cabinet defining tunnel means for defining an optical path between a video terminal and a viewer, said tunnel means being placed in a vertical configuration, with said tunnel means comprising an open end for accepting and holding said video terminal in a down facing position;
   reflector means for redirecting an image generated by said video terminal, said reflector means being placed inside said tunnel means at an angle whereby said image is directed by said reflector means through an aperture in the side of said tunnel means, for the viewing of said image by said viewer;
   wherein said tunnel means is formed of a predetermined material, and grounding means for conducting undesireable electromagnetic fields is attached to said tunnel means;
   and wherein said tunnel means is situated on a stand with means for rotating and varying height.

2. A device as according to claim 1 wherein said tunnel means is formed of a conductive material and said grounding means comprises a grounding wire attached directly to said tunnel means.

3. A device according to claim 1 wherein said tunnel means is formed of a non-conductive material and said grounding means comprises aluminum foil affixed to the inside of said tunnel means with a grounding wire attached to said aluminum foil.

4. A device as according to claim 1 wherein said aperture includes a glare shield or magnification device attached thereto.

* * * * *